July 15, 1930.  H. FISCHER  1,770,608
INTERNAL COMBUSTION ENGINE
Filed Nov. 30, 1925
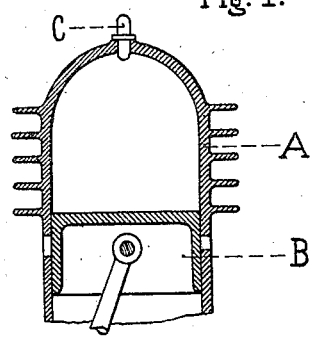
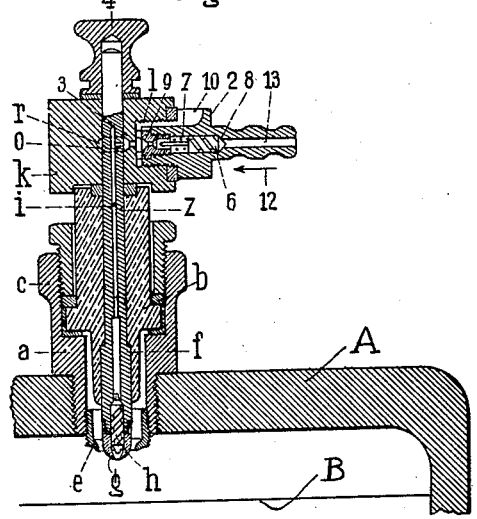
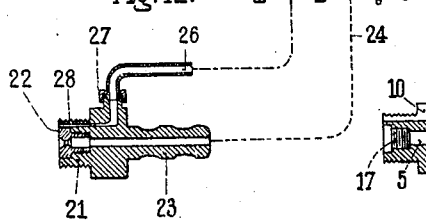
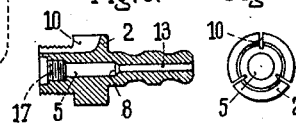
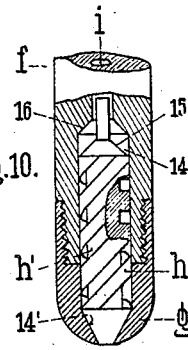
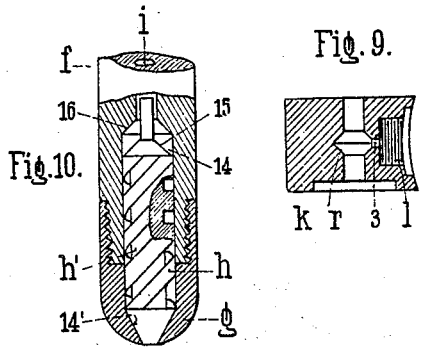
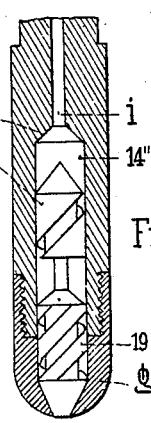
INVENTOR
Hermann Fischer.
by
Frank Reinhold.
Attorney.

Patented July 15, 1930

1,770,608

UNITED STATES PATENT OFFICE

HERMANN FISCHER, OF BERLIN-NEUKOLLN, GERMANY

INTERNAL-COMBUSTION ENGINE

Application filed November 30, 1925, Serial No. 72,391, and in Germany December 4, 1924.

My invention relates to improvements in internal combustion engines, and more particularly in engines of the type comprising means for supplying water to the combustible mixture.

One of the objects of the improvements is to provide an engine in which the water is injected directly into the cylinder. Thereby each charge receives so much water as is necessary for insuring the best results, and in this respect my improved engine is superior to engines in which the water is injected into the intake pipe in which the temperature of the mixture is comparatively low, so that a part of the water is condensed and deposited on the wall of the intake pipe from which it is taken up again by the current of combustible mixture and carried into the cylinder in an irregular way. If, however, the water is directly injected in a state of fine distribution into the cylinder each charge of the cylinder has the desired amount of water added thereto, and the water is immediately vaporized by the heat within the cylinder. In the preferred form of my invention I use the water to be added to the combustible mixture for cooling the spark plug, by injecting the same through a longitudinal bore of the inner electrode of the said plug.

In the operation of the engine it is difficult to inject the small amounts of water needed in my improved method. Therefore I inject the said water by means of a current of air injected into the cylinder either by the vacuum produced therein upon the suction stroke, or by means of a receptacle containing the said air under pressure, or by means of an air pump. The water is distributed within the current of air before being injected into the cylinder, and it is minutely distributed within the cylinder together with the air. When injecting the mixture of air through the spark plug the air has a strong cooling effect on the said plug.

For the purpose of explaining the invention two examples embodying the same have been shown in the accompanying drawings, in which the same reference characters have been used in all the views to indicate corresponding parts. In said drawings, Fig. 1 is a sectional view showing an internal combustion engine in a diagrammatical way, Fig. 2 is a detail sectional view showing the spark plug in place in the wall of the cylinder of an internal-combustion engine.

Fig. 3 is a detail sectional view showing the tubular member through which air and water are supplied to the spark plug, Fig. 4 is an end view looking from the left in Fig. 3, Figs. 5 and 6 are respectively a sectional view and an end view of the nozzle fitted in the member shown in Figs. 3 and 4, Fig. 7 is an elevation showing the valve controlling the supply of water to the spark plug and located within the tubular member shown in Figs. 3 and 4, Fig. 8 is an elevation showing the spring acting on the said valve, Fig. 9 is a sectional elevation showing the block fixed to the spark plug and having the tubular member shown in Figs. 3 and 4 fixed thereto, Fig. 10 is a detail sectional view on an enlarged scale showing the valve and spraying member provided at the delivery end of the spark plug, Fig. 11 is a similar view showing a modification, and Fig. 12 is a diagrammatical view showing a modification, the spark plug being shown partly in section and on an enlarged scale, and the pumps for supplying air and water to the spark plug being shown in a diagrammatical way.

My improved method may be used in connection with two stroke cycle or four stroke cycle internal combustion engines of any known or preferred type, and I have shown the said engine in Fig. 1 in a conventional way, the letter A indicating the cylinder, the letter B the plunger and the letter C the spark plug.

The general construction of the spark plug is known in the art, and, as shown, it comprises a tubular member $a$ screwing in a bore of the wall of the cylinder, a tubular insulating body $b$ of porcelain or the like fixed to the member $a$ by means of a tubular plug $c$ screwing in the member a, an inner electrode z mounted within the body b and an outer electrode e. It will be observed that the electrode z is insulated from the body of the wall of the cylinder both electrically and thermally.

The inner electrode z is provided with an axial bore i extending from the delivery end of the electrode to a point away from the outer or rear end thereof. To the inner or delivery end of the electrode a cap g is screwed, which is formed with a tapering delivery passage, and near the delivery end and within the cap g the axial bore is enlarged, as is shown at 14 in Fig. 10, the said enlarged portion being bounded by a conical valve seat 16. Within the enlarged portion 14 a combined valve and spraying member h is axially movable, which is formed with a conical face 15 corresponding to the conical valve seat 16 and with helical grooves h' disposed around the body h and providing passages through which the tapering portion 14' communicates with the bore i.

Above the insulating body b the inner electrode z carries a cylindrical block k, which is fixed in position by means of a cap nut 4 screwing on the rear end of the electrode z. The said block k is formed internally with an annular chamber r disposed concentrically all around the electrode z and communicating with the bore i thereof through one or more transverse bores o. The block k is formed with a screw-threaded socket l communicating with the chamber r through a bore 3 and having a tubular member 2 screwed thereto. As appears more particularly from Fig. 3 the bore of the said tubular member comprises a portion 13 of small diameter, a portion 5 of enlarged diameter, and a screw-threaded portion 17. The portion 5 provides a valve chamber in which a valve 6 made integral with an axial needle valve 20 has reciprocating movement, and the said valve is adapted to be forced by a spring 7 with its conical outer end on a conical valve seat 8 made in the body 2. The needle valve 20 projects into a nozzle 9 screwed into the portion 17 of the body 2 and having a small axial bore adapted to be closed by the needle valve 20, as is best shown in Fig. 5. Further, the valve 6 is provided circumferentially with a helical groove 11 permitting the passage of water therethrough, as will be described hereinafter. The body 2 is provided at its outside with longitudinal grooves or slots 10 providing air passages communicating with the outer air and the bore 3. The tubular member 2 is connected with a supply of water.

In describing the operation of the spark plug reference will be made to a four stroke cycle internal combustion engine. While the plunger performs its compression, explosion and exhaust strokes the parts of the plug are in the positions shown in Fig. 2, the valve 6 closing the inlet passage 13, and the body h closing the bore i. Therefore no water can flow into the spark plug, and the gases within the cylinder have no access to the bore i of the spark plug. When the plunger performs its suction stroke the valve h is unseated and moved downwardly, so that the suction is transmitted from the cylinder to the chamber r, the chamber 5 of the valve 6 and the air passages 10. Therefore a current of air rushes through the slots 10, the bore 3, the chamber r, the bore i, the helical grooves h', the tapering portion 14' and into the cylinder. Further, by the suction the valve 6 is unseated against the pressure of the spring 7 and a slight amount of water is taken from the chamber 5 and the bore of the nozzle 9 into the current of air. Immediately after the valve 6 has been removed from the seat 8 the needle valve 20 closes the bore of the nozzle 9, so that only a very small amount of water is taken into the current of air and a small amount of fresh water is taken through the helical groove 11 into the chamber 5. The water is thoroughly mixed with the current of air, and it moves therewith in minute distribution through the hot electrode z, where it is transformed into vapor or superheated steam. The mixture of air and vapor is delivered through the helical grooves h' where whirling movement is imparted thereto before it is delivered into the cylinder, so that complete distribution of the air and the slight amount of steam contained therein is insured. The small amount of water which is thrown into the cylinder in the form of steam has practically no cooling effect on the charge taken into the cylinder, so that high temperature is produced by the ignition of the charge. When thus adding small amounts of water to the air taken into the cylinder, the combustion of the mixture is considerably improved, as is shown by the fact that even after a long period of time the terminals of the spark plug are perfectly clean, and when adding water to the charge of an engine the cylinder of which was soiled by incrustations all the incrustations are removed. In my improved apparatus the spark plug is sufficiently cooled by the mixture of air and water flowing through the same.

In Fig. 11 I have shown a modification of the spraying nozzle provided at the inner end of the electrode. As shown in the said figure the spraying member and valve are made in two sections 18 and 19, the section 18 being the valve cone and having a helical groove, while the section 19 has merely the function to distribute the current of air and steam delivered from the nozzle. By thus separating the valve from the spraying member the valve is more accurately placed on its seat, which is important in order to prevent any access of the burnt gases from the cylinder to the bore of the plug.

When using the spark plug in connection with a two stroke cycle internal combustion engine the suction produced within the cylinder near the end of the explosion stroke and after opening the exhaust is sufficient to produce a current of air and water through the spark plug.

I have found that by means of the apparatus described herein the amount of water supplied to the cylinder can be exactly regulated by providing a nozzle 9 and a spring 7 of the proper dimensions, or by otherwise regulating the supply of water to the spark plug. In some cases I prefer to provide pumps for supplying measured amounts of air and water to the spark plug. When thus feeding air and water by means of pumps the construction of the spark plug may be the same as has been described with reference to Figs. 1 to 11, and I have shown in Fig. 12 only the tubular member 2 containing the passages for the supply of air and water. However, in the said tubular member the valve 6 may be dispensed with, the supply of water being controlled by the pump. The tubular member 21 is provided with a nozzle 22, and its nipple 23 is connected with the pump by a pipe 24. Further, it has a pipe 26 connected thereto by means of a cap screw 27, which pipe opens through a bore 28 into the block $k$ of the spark plug. The pipe 26 is connected with an air compressor. In the example shown in the figure I use an air compressor and a water pump of the type shown and described in the patents of the United States to Egersdörfer, No. 1,466,092, granted August 28, 1923 and No. 1,422,946, granted July 22, 1922, the rotary members of the said compressor and pump being mounted on a common shaft. In Fig. 12 the air compressor has received the reference character 29, and the pump has received the reference character 30. For regulating the amount of water a lever 31 connected with the swash plate of the pump is provided.

While in describing the invention reference has been made to two particular examples embodying the same I wish it to be understood that my invention is not limited to the constructions shown in the drawings, and that various changes may be made in the general arrangement of the apparatus and the construction of its parts without departing from the invention.

I claim:

1. An internal combustion engine, comprising the cylinder, a piston reciprocating therein, means for charging said cylinder with a combustible mixture and discharging the burnt gases therefrom, igniting means having a passage opening into said cylinder and constructed at its delivery end in the form of a spraying nozzle, and means to supply a mixture of air and water through said passage and into the cylinder.

2. An apparatus for injecting water into the cylinder of an internal combustion engine, comprising a tubular member adapted to be fixed to the cylinder in position for communicating with the combustion chamber thereof, said tubular member having a valve chamber bounded by opposing valve seats, a valve fitted in said valve chamber in position for engaging with its ends either one of said seats and formed externally with a helical groove extending from end to end, and a supply of water to said member through the valve chamber thereof.

3. An apparatus for injecting water into the cylinder of an internal combustion engine, comprising a tubular member adapted to be fixed to the cylinder in position for communicating with the combustion chamber thereof, said tubular member having a valve chamber bounded by opposing valve seats, a valve within said valve chamber in position for engaging with its ends either one of said seats, and a supply of water to said member through the valve chamber thereof, said member being formed with air passages opening into the same at a part intermediate said valve chamber and its delivery end.

4. An internal combustion engine, comprising the cylinder, a piston reciprocating therein, means for charging said cylinder with a combustible mixture and discharging the burnt gases therefrom, igniting means comprising an outer electrode and an inner electrode formed with a passage opening into said cylinder, and means to supply a mixture of air and water through said passage and into the cylinder.

5. An internal combustion engine, comprising the cylinder, a piston reciprocating therein, means for charging said cylinder with a combustible mixture and discharging the burnt gases therefrom, igniting means comprising an outer electrode and an inner electrode formed with a passage opening into said cylinder and constructed at its delivery end in the form of a spraying nozzle, and means to supply a mixture of air and water through said passage and into the cylinder.

6. An internal combustion engine, comprising a cylinder, a piston reciprocating therein, means for charging said cylinder with a combustible mixture and discharging the burnt gases therefrom, igniting means having a passage opening into said cylinder and constructed at its delivery end in the form of a spraying nozzle, and means to supply water through said passage and into the cylinder.

In testimony whereof I hereunto affix my signature.

HERMANN FISCHER.